(12) United States Patent
Angeli et al.

(10) Patent No.: US 8,710,126 B2
(45) Date of Patent: Apr. 29, 2014

(54) FLAME-PROOFED THERMOPLASTIC COMPOSITIONS

(75) Inventors: Silvia Angeli, Saronno (IT); Xavier Couillens, Tournefeuille (FR); Michelangelo Amorese, Milan (IT)

(73) Assignee: Rhodia Operations, Aubervilliers (FR)

( * ) Notice: Subject to any disclaimer, the term of this patent is extended or adjusted under 35 U.S.C. 154(b) by 0 days.

(21) Appl. No.: 12/665,454

(22) PCT Filed: Jun. 17, 2008

(86) PCT No.: PCT/EP2008/057588
§ 371 (c)(1),
(2), (4) Date: May 13, 2010

(87) PCT Pub. No.: WO2008/155319
PCT Pub. Date: Dec. 24, 2008

(65) Prior Publication Data
US 2010/0216918 A1 Aug. 26, 2010

(30) Foreign Application Priority Data
Jun. 20, 2007 (FR) ..................................... 07 04389

(51) Int. Cl.
*C08K 5/53* (2006.01)
*C08K 5/34* (2006.01)

(52) U.S. Cl.
USPC .......................................... 524/123; 524/100

(58) Field of Classification Search
USPC .......................................................... 524/123
See application file for complete search history.

(56) References Cited

U.S. PATENT DOCUMENTS

| | | | |
|---|---|---|---|
| 6,635,697 B2 * | 10/2003 | Kuwaki et al. ................ | 524/100 |
| 7,473,726 B2 | 1/2009 | Mitchell et al. | |
| 2004/0034132 A1 * | 2/2004 | Campbell et al. ............. | 524/184 |
| 2005/0113496 A1 * | 5/2005 | Saga ............................. | 524/115 |

FOREIGN PATENT DOCUMENTS

FR 2843592 A1 2/2004
WO WO 2005/033193 A1 4/2005

* cited by examiner

*Primary Examiner* — Hui Chin
(74) *Attorney, Agent, or Firm* — Dentons US LLP

(57) ABSTRACT

Flame-proofed thermoplastic compositions include organophosphorus compounds as flame retardants; thermoplastic articles shaped therefrom do not experience deterioration of the appearance of the surfaces thereof by corrosion or deposition.

5 Claims, No Drawings

FLAME-PROOFED THERMOPLASTIC COMPOSITIONS

CROSS-REFERENCE TO EARLIER APPLICATIONS

This application is a national phase of PCT/EP2008/057588, filed Jun. 17, 2008 and designationg the U.S. (published in the French language on Dec. 24, 2008, as WO 2008/155319 A1; the title and abstract were also published in English), which claims foreign priority under 35U.S.C. §119 of FR 0704389, filed Jun. 20, 2007, each hereby expressly incorporated by reference in its entirety and each assighned to the assignee hereof.

The present invention relates to flame-proofed thermoplastic compositions comprising organophosphorus compounds as flame retardants. These compositions make it possible to produce thermoplastic parts that do not cause deterioration of the surface appearance of metal parts by corrosion or deposition. The invention also relates to articles comprising flame-proofed thermoplastic parts and metal parts.

PRIOR ART

Compositions based on thermoplastic resins are used for producing articles by various forming processes. These articles must have high mechanical properties but also properties of chemical resistance, electrical insulation, and also good flame retardancy when these components catch fire. One of the important aspects is that these components should not catch fire, that is to say should not produce flames; or else catch fire but at the highest possible temperatures.

The flame retardancy of compositions based on a thermoplastic matrix has been studied for a very long time. Thus, the main flame retardants used are red phosphorus, halogenated compounds such as polybromodiphenyls, polybromodiphenyl ethers, brominated polystyrenes, nitrogen-containing organic compounds belonging to the class of triazines such as melamine or its derivatives such as melamine cyanurate and more recently melamine phosphates, polyphosphates and pyrophosphates, or organophosphorous acids and their salts.

However, the applicant has brought to light the existence of a particular corrosive mechanism that leads to a deterioration of the surface appearance of metal parts which are in contact with or in the vicinity of flame-proofed thermoplastic parts. Thus it has been observed that most of the flame retardants included in thermoplastic parts will lead to the corrosion of the surface of the metal parts, especially under the influence of external factors such as temperature, water and/or oxygen. Furthermore, these flame retardants, or derivatives thereof, are deposited on the surface of the metal parts, by migration and/or extraction phenomena in the thermoplastic matrix.

These marks of corrosion and of deposition on the metal parts eventually result in a reduction of their service life and in the modification of some of their intrinsic properties, such as their electrical conductivity.

Starting from this problem there is thus a need to find flame retardants perfectly suitable for the flame-proofed thermoplastic compositions flame-retardant, which are also capable of not deteriorating the surface of metal parts that are in contact or in the vicinity; and also articles comprising plastic parts and metal parts that have a good surface appearance, especially in an environment comprising water and/or oxygen at various temperatures.

It should be specified that the corrosion phenomena caused by flame retardants such as red phosphorus or halogenated derivatives during the conversion of the thermoplastic composition and its transition to the molten state are known to a person skilled in the art. This is because the change in temperature necessary for the production of flame-proofed thermoplastic compositions or for the forming of articles comprising the latter imposes a thermal stress on the flame retardant at temperatures often close to its degradation temperature. Consequently, the flame retardant being subjected to a sometimes prolonged thermal stress may degrade generating, in a molten medium, corrosive species responsible for the corrosion of the metal parts in contact with the latter such as the screws and barrels of extruders, the screws and barrels of injection-molding presses and also the channels or hot blocks and the molds.

Furthermore, the flame retardants of halogenated type and also red phosphorus are very predominantly associated, in thermoplastic compositions, with reinforcing fillers in order to guarantee the articles produced a certain rigidity. And in order to do this, acicular fillers of high hardness such as glass fiber and also mineral fillers with a high aspect ratio and high hardness such as wollastonite are preferably used. The latter are also known for generating, in a molten medium, mechanical wear and abrasion phenomena of the metal parts of extruders and injection-molding presses. It is therefore difficult, for this type of composition, to separate the abrasion phenomena generated mechanically by the reinforcing fillers during the transportation of the molten stream from the chemical corrosion phenomena generated at temperature by the degradation of the flame retardants. This is, in reality, a combined phenomenon for which these two modes of action result, in a molten medium, in a corrosion phenomenon. This is because the mechanical abrasion associated with the fillers generates defects within the metal parts which can subsequently be more easily corroded by a chemical process.

The corrosive mechanism brought to light by the applicant according to the present invention is different since it occurs in the absence of thermal stress which may induce the degradation of the flame retardants and the creation of corrosive species, and in the absence of phenomena of stream transportation and therefore of mechanical abrasion making it possible to create surface defects within the metal parts. Indeed, within the context of the present invention, the thermoplastic and metal parts are in the solid state and are in contact or in the vicinity. The nature and the means of action of the corrosive phenomena thereof are therefore in essence different since they must involve extraction and/or migration phenomena of the corroding species which could not take place in a molten medium.

INVENTION

The applicant has unexpectedly discovered that the use of organophosphorus flame-retardant compounds in a thermoplastic matrix makes it possible to produce a thermoplastic part that does not lead to, or that limits, a deterioration of the surface of a metal part located in contact with or in the vicinity of said thermoplastic part.

Furthermore, these thermoplastic compositions exhibit a very satisfactory level of flame retardancy and good mechanical properties.

One subject of the present invention is thus the use of an organophosphorus compound in a thermoplastic matrix for producing a thermoplastic part that makes it possible to prevent, to lessen or to reduce the degradation of the surface appearance of a metal part located in contact with or in the vicinity of the thermoplastic part.

The distance between the metal part and the thermoplastic part is generally less than or equal to 1 cm, preferably less than or equal to 0.5 cm, more preferably still less than or equal to 0.1 cm.

The metal part may be constituted of a metal or of an alloy of various metals, optionally covered, completely or partially, by a metallic deposition. The metal part may, for example, comprise one or more metals chosen from the group comprising copper, zinc, nickel and silver. Mention may be made, by way of example, of an alloy of copper and of zinc which may be partially covered by a deposition of silver, of a mixture of silver and of nickel, or else of a mixture of silver and of tin.

All the organophosphorus compounds, especially those conventionally used as a flame retardant for thermoplastic matrices, may be used according to the invention. The expression "organophosphorus compound" is understood to mean a compound comprising at least one covalent phosphorus/carbon bond and/or a covalent phosphorus/oxygen bond associated with a phosphorus/oxygen double bond.

Organophosphorus compounds that are in the solid state at a temperature of 25° C. are particularly preferred.

As the organophosphorus compounds, the following are especially preferred: phosphinic acids or salts thereof, such as 2-carboxyethyl(phenyl)phosphinic acid, phosphonic acids or salts thereof, phosphites such as triphenylphosphite or trimethylphosphite, organophosphates such as resorcinol bis(diphenylphosphate) and bisphenol A bis(diphenylphosphate), phosphonates such as dimethylphosphonate, polyphosphates such as melamine polyphosphates or ammonium polyphosphates, and phosphine oxides such as triphenylphosphine oxide, tri(3-hydroxypropyl)phosphine oxide and bis(p-hydroxy-phenyl)alkylphosphine oxides.

Very especially preferred as organophosphorus compounds are the phosphinic acid salts of formula (I):

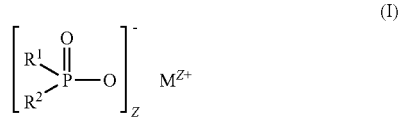

in which:
R$^1$ and R$^2$ are identical or different and represent a linear or branched alkyl chain comprising from 1 to 6 carbon atoms, preferably from 1 to 3 carbon atoms, and/or an aryl radical;
M represents a calcium, magnesium, aluminum and/or zinc ion, preferably a magnesium and/or aluminum ion; and
Z represents 2 or 3, preferably 3.

R$^1$ and R$^2$ may be identical or different and represent a methyl, ethyl, n-propyl, isopropyl, n-butyl, tert-butyl, n-pentyl and/or aryl such as a phenyl for example. M is preferably an aluminum ion.

Particularly preferred as an organophosphorus compound are the phosphinic acids or salts chosen, for example, from the group comprising: dimethylphosphinic acid, ethylmethylphosphinic acid, diethylphosphinic acid, methyl-n-propylphosphinic acid, and/or the mixture thereof.

Various phosphinic acids may especially be used in combination.

These compounds are, for example, described in patent U.S. Pat. No. 6,255,371. These phosphinic acid salts may be prepared according to the usual methods well known to a person skilled in the art, such as for example that described in patent EP 0 699 708. These phosphinic acid salts may be used in various forms depending on the nature of the polymer and on the desired properties. For example, in order to obtain a good dispersion in the polymer, a phosphinic acid salt may be in the form of fine particles.

The thermoplastic part according to the invention may comprise from 1 to 30% by weight, preferably from 5 to 25% by weight of organophosphorus compounds.

Use may especially be made, in combination with an organophosphorus compound, especially a phosphinic acid or its salt, of a compound that is the reaction product between phosphoric acid and melamine and/or the reaction product between phosphoric acid and a melamine condensation derivative. This compound may be chosen, for example, from the group comprising the following reaction products: melamine polyphosphate, melam polyphosphate and melem polyphosphate, and/or the mixture thereof. It is particularly preferable to use a melamine polyphosphate having chains with a length greater than 2, and in particular greater than 10. These compounds are especially described in patent WO 9839306 and U.S. Pat. No. 6,255,371. These compounds may also be obtained by processes other than those based on the direct reaction with a phosphoric acid. For example, melamine polyphosphate may be prepared by reaction of melamine with polyphosphoric acid (see WO 9845364), but also by condensation of melamine phosphate and of melamine pyrophosphate (see WO 9808898).

As the thermoplastic matrix according to the invention, use may especially be made of olefin resins such as polyethylene, polypropylene and polybutylene, polyisobutylene, styrene resins such as polystyrenes and acrylonitrile-butadiene-styrene copolymers, polyamides, polyacetals, polyesters such as polyethylene terephthalate and polybutylene terephthalate, polycarbonates, polyester carbonates, polysulfone resins, polyphenylene oxides, polyphenylene ethers, polyphenylene sulfides, vinyl polymers and copolymers thereof such as polyvinyl acetate, polyvinyl alcohol, polyvinyl chloride, derivatives thereof and/or blends thereof.

As the polyamide according to the invention, mention may be made of semicrystalline or amorphous polyamides and copolyamides such as aliphatic polyamides, semiaromatic polyamides and, more generally, the linear polyamides obtained by polycondensation between an aliphatic or aromatic saturated diacid and an aromatic or aliphatic saturated primary diamine, the polyamides obtained by condensation of a lactam, of an amino acid or the linear polyamides obtained by condensation of a mixture of these various monomers. More specifically, these copolyamides may be, for example, polyhexamethylene adipamide, polyphthalamides obtained from terephthalic and/or isophthalic acid, copolyamides obtained from adipic acid, hexamethylene diamine and caprolactam.

According to one preferred embodiment of the invention, the thermoplastic matrix is a polyamide chosen from the group comprising polyamide PA-6, polyamide PA-6,6, polyamide PA-11, polyamide PA-12, polymetaxylylenediamine (MXD6), and the blends and copolymers based on these polyamides.

The polyamide is preferably chosen from the group comprising the polyamides obtained by polycondensation of a linear carboxylic diacid with a linear or cyclic diamine such as PA-6,6, PA-6,10, PA-6,12, PA-12,12, PA-4,6, MXD-6 or between an aromatic carboxylic diacid and a linear or aromatic diamine such as polyterephthalamides, polyisophthalamides, polyaramids, the polyamides obtained by polycondensation of an amino acid with itself, the amino acid possibly being generated by hydrolytic opening of a lactam ring such as, for example, PA-6, PA-7, PA-11 or PA-12.

The composition of the invention may also comprise the copolyamides derived, in particular, from the polyamides above, or the blends of these polyamides or copolyamides.

The preferred polyamides are polyhexamethylene adipamide, polycaprolactam, or the copolymers and blends between polyhexamethylene adipamide and polycaprolactam.

Use is generally made of polyamides having molecular weights suitable for injection-molding processes, although polyamides of lower viscosities may also be used.

The polyamide matrix may especially be a polymer comprising star-shaped or H-shaped macromolecular chains, and where appropriate linear macromolecular chains. The polymers comprising such star-shaped or H-shaped macromolecular chains are, for example, described in documents FR 2743077, FR 2779730, U.S. Pat. No. 5,959,069, EP 0632703, EP 0682057 and EP 0832149.

According to another particular variant of the invention, the polyamide matrix of the invention may be a polymer of random tree type, preferably a copolyamide having a random tree structure. These copolyamides of random tree structure and also their process of preparation are especially described in document WO 99/03909. The matrix of the invention may also be a composition comprising a linear thermoplastic polymer and a star-shaped, H-shaped and/or tree-type thermoplastic polymer as described above. The matrix of the invention may also comprise a hyperbranched copolyamide of the type of those described in document WO 00/68298. The composition of the invention may also comprise any combination of linear, star-shaped, H-shaped, tree-type, thermoplastic polymer or hyperbranched copolyamide as described above.

The composition according to the invention preferably has from 40 to 80% by weight of polyamide, relative to the total weight of the composition.

The composition of the invention may also comprise other compounds or additives generally used in compositions based on a thermoplastic matrix, such as for example: reinforcing or bulking fillers, heat stabilizers, nucleating agents, plasticizers, flame retardants, smoke suppressants, zinc borate, antioxidants, UV stabilizers, dyes, optical brighteners, lubricants, anti-blocking agents, mattifying agents such as titanium oxide, processing aids, elastomers, adhesion agents, dispersants, pigments, impact modifiers, active oxygen scavengers or absorbers, agents for laser marking, and/or catalysts.

The composition of the invention may especially comprise reinforcing or bulking fillers chosen from the group comprising fibrous fillers such as glass fibers, aramid fibers and carbon fibers; and/or mineral fillers, such as aluminosilicate clays, kaolin, wollastonites, talcs, calcium carbonates, fluoromicas, calcium phosphates and derivatives, and glass frit. The weight concentration of the reinforcing fillers is advantageously between 1% and 50%, preferably between 15% and 50%, by weight relative to the total weight of the composition.

There is no limitation on the types of impact modifiers. These are generally polymers of elastomers that can be used for this purpose. Resilience modifiers are generally defined as having an ASTM D-638 tensile modulus of less than around 500 MPa. Examples of suitable elastomers are ethylene/acrylic ester/maleic anhydride, ethylene/propylene/maleic anhydride, and EPDMs (ethylene-propylene-diene monomers) optionally with a grafted maleic anhydride. The weight concentration of elastomer is advantageously between 0.1 and 30% relative to the total weight of the composition.

The materials and compositions of the invention are generally obtained by hot-blending the various constituents, for example in a single-screw or twin-screw extruder, at a sufficient temperature to keep the polyamide resin in the melt state; or by cold-blending in a mechanical mixer in particular. Generally, the blend obtained is extruded in the form of rods which are cut into pieces in order to form granules. The organophosphorus compounds may be added at any moment of the process for manufacturing the plastic material, especially by hot- or cold-blending with the thermoplastic matrix.

The addition of the compounds and of the additives may be carried out by addition of these compounds into the molten thermoplastic matrix in pure form or in the form of a concentrated blend in a matrix such as, for example, a thermoplastic matrix.

The granules obtained are then used as a raw material for feeding the processes for manufacturing articles such as injection-molding, extrusion or extrusion-blow molding processes.

The invention also relates to an article comprising at least, in contact or in the vicinity, a metal part and a thermoplastic part, said thermoplastic part comprising an organophosphorus compound as a flame retardant.

The present invention also relates to a process for manufacturing an article as described previously, comprising at least one step of mixing an organophosphorus compound into a thermoplastic matrix. As explained previously, the organophosphorus compound may be added at any moment of the process for manufacturing the plastic material, especially by hot- or cold-blending with the thermoplastic matrix.

These articles may be obtained by forming the composition of the invention, by any plastic conversion or forming technique, such as for example by extrusion, by molding such as for example by compression molding, molding by thermoforming or by rotomolding; by injection such as for example by injection molding or injection-blow molding.

The expression "thermoplastic part" is understood to mean a solid part obtained by forming a composition according to the invention comprising at least one thermoplastic matrix and an organophosphorus compound.

The invention relates very particularly to electrical or electronic articles comprising at least one thermoplastic part and at least one metal part, such as for example electrical outlets, electric circuit-breakers, programmers, especially for electric household appliances, anti-theft alarms, electrical switches, electrical adapters, cables, batteries and battery testers, telephones, and coils.

Specific language is used in the description so as to facilitate the understanding of the principle of the invention. It should nevertheless be understood that no limitation of the scope of the invention is envisaged by the use of this specific language. Modifications, improvements and developments may especially be envisaged by a person acquainted with the technical field in question on the basis of his own general knowledge.

The term "and/or" includes the meanings and, or, and also all the other possible combinations of the elements connected to this term.

Other details or advantages of the invention will appear more clearly in view of the examples given below solely by way of indication.

EXPERIMENTAL SECTION

Example 1

Manufacture of Polyamide Granules

Compositions were prepared by mixing components in the proportions indicated in table 1 below in a Werner &

Pfleiderer ZSK 40 twin-screw extruder having a screw speed of 200 rpm and an output of 35 kg/h, at a temperature of 270° C. Glass fibers were added to the mixture at the throat of the extruder. The mixture was extruded in the form of rods which were cut in order to obtain granules.

The compositions produced were the following:

A: The composition comprises polyamide 6,6 (PA-6,6) having a viscosity number of 140 ml/g, according to the ISO 307 standard, measured in formic acid, and an $M_n$ of 17 600 g/mol, measured by GPC; and
   30% by weight of 983 glass fibers from Vetrotex.

B: The composition comprises the same PA-6,6 as in composition A, and
   7% by weight of red phosphorus (by introduction of 10% of masterbatch: Masteret 24470-Masterbatch 70/30 Italmatch);
   25% by weight of 983 glass fibers from Vetrotex.

C: The composition comprises the same PA-6,6 as in composition A, and
   21% by weight of brominated polystyrene: PDBS 80 (Chemtura);
   30% by weight of 983 glass fibers from Vetrotex; and
   6% by weight of zinc borate.

D: The composition comprises the same PA-6,6 as in composition A, and
   11.6% by weight of aluminum diethylphosphinate (Clariant);
   5.8% by weight of M200 melamine polyphosphate (Ciba); and
   30% by weight of 983 glass fibers from Vetrotex.

Example 2

Test of the Resistance to Deterioration of the Surface of Metal Parts 10 g of polymer, in granules, were introduced into a glass flask with 1 g of a metal article, having a surface area of 6 cm², and 2 ml of distilled water. The flask was stoppered and placed in an oven at 80-90° C. for 7 days. In example C1, no granule was placed in the presence of a metal article.

The metal articles were then recovered and the presence of marks of corrosion or of depositions was observed. The nature of the corrosion was assessed by observation using a Philips XL30 scanning electron microscope with quantitative X-ray microanalysis (SEM/EDAX).

The results are mentioned in the table below:

TABLE 1

|  | C1 | C2 | C3 | C4 | 1 |
|---|---|---|---|---|---|
| Granules | none | Composition A | Composition B | Composition C | Composition D |
| Visual observation | Presence of very limited marks | Presence of very limited marks | Presence of marks and deposits | Presence of marks and white deposits | Presence of very limited marks |
| SEM/EDAX observation | Cu/Zn oxides | Cu/Zn oxides | Cu/Zn oxides phosphorus deposit | Cu/Zn oxides bromine deposit | Cu/Zn oxides slight phosphorus deposit |

A significant reduction in the corrosion of the metal parts and also of the deposits at the surface is thus observed going from the worst red phosphorus flame retardant systems to the organophosphorus compounds according to the invention, which are the best; for performances, in terms of flame-retardant properties, which are identical or even better (GWFT 960° C. at 1 mm and UL-V0 at 0.8 mm).

The qualitative evaluation of the surface of the metal parts after the tests clearly demonstrates that the chemical nature of the organophosphorus systems has a significantly lower effect on the generation of corrosive species and/or of deposits, and consequently on the service life of these same parts, than the conventional flame-retardant systems of brominated or red phosphorus type.

Furthermore, it should be noted that the composition D according to the invention has a V0 classification in the UL94 test with molded test specimens having a thickness of 0.8 mm; whereas the composition A has an NC (non-classifiable) classification according to the UL 94 test.

The invention claimed is:

1. A method of reducing at least one of corrosion of a metal part and deposition of a flame retardant on a surface of a metal part, said method comprising:
   shaping a thermoplastic matrix comprising at least one phosphinic acid salt of formula (I):

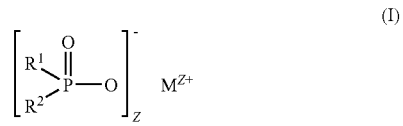

in which:
   $R^1$ and $R^2$, which may be identical or different, are each a linear or branched alkyl radical having from 1 to 6 carbon atoms, and/or an aryl radical;
   M is a calcium, magnesium, aluminum and/or zinc ion; and
   Z is 2 or 3, by a plastic conversion or forming technique selected from the group consisting of extrusion, molding and injection, thereby obtaining a thermoplastic shaped part in a solid state; and
   placing said thermoplastic part in a solid state in contact with, or within approximately 1 cm of said metal part in a solid state.

2. The process as defined by claim 1, wherein the thermoplastic shaped part comprises from 1 to 30% by weight of organophosphorus compounds.

3. The process as defined by claim 1, wherein the thermoplastic shaped part also comprises a compound that is the reaction product from phosphoric acid and melamine and/or the reaction product from phosphoric acid and a melamine condensation derivative.

4. The process as defined by claim 1, wherein the thermoplastic shaped part is produced from a thermoplastic matrix recited from the group consisting of olefin resins, polyethylene, polypropylene and polybutylene, polyisobutylene, styrene resins, polystyrenes and acrylonitrile-butadiene-styrene copolymers, polyamides, polyacetals, polyesters, polyethylene terephthalate and polybutylene terephthalate, polycarbonates, polyester carbonates, polysulfone resins, polyphenylene oxides, polyphenylene ethers, polyphenyiene sulfides, vinyl polymers and copolymers thereof, polyvinyl acetate, polyvinyl alcohol, polyvinyl chloride, derivatives thereof and/or mixtures thereof.

5. The process as defined by claim 1, wherein the thermoplastic shaped part comprises a polyamide matrix selected from the group consisting of polyimide PA 6, polyarnide PA 6,6, polyimide PA-11, polyimide PA 12, polymetaxylylenediamine, and blends and copolymers thereof.

* * * * *